(No Model.)
R. N. WARREN & W. H. WIKE.
VEHICLE COVER.
No. 495,859. Patented Apr. 18, 1893.
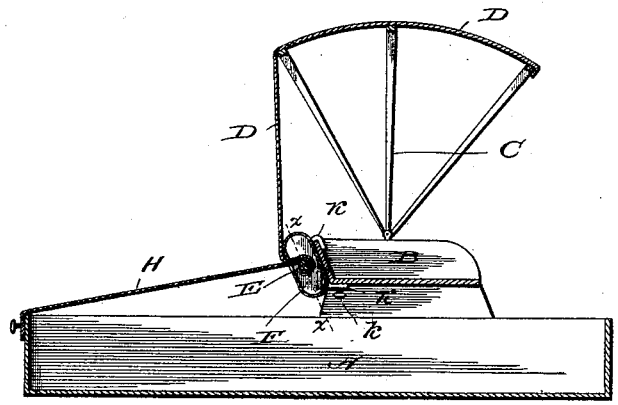
Fig. 1.
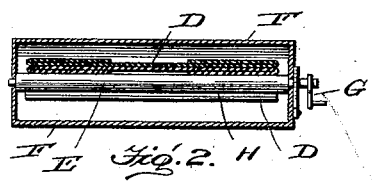
Fig. 2.
Fig. 3.
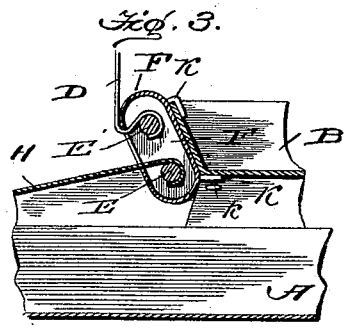
Fig. 4.
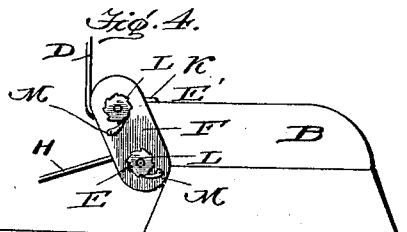
WITNESSES:
Wm C Dashiell
Arthur L Bryant
INVENTORS
R. N. Warren.
W. H. Wike.
BY Edson Bros
ATTORNEYS

UNITED STATES PATENT OFFICE.

ROLAN N. WARREN AND WILLIAM H. WIKE, OF WOOSTER, OHIO.

VEHICLE-COVER.

SPECIFICATION forming part of Letters Patent No. 495,859, dated April 18, 1893.

Application filed January 12, 1893. Serial No. 458,173. (No model.)

*To all whom it may concern:*

Be it known that we, ROLAN N. WARREN and WILLIAM H. WIKE, citizens of the United States, residing at Wooster, in the county of Wayne and State of Ohio, have invented certain new and useful Improvements in Vehicle-Covers; and we do hereby declare the following to be a full, clear, and exact description of the invention, such as will enable others skilled in the art to which it appertains to make and use the same.

Our invention relates to improvements in covers for vehicles and the object of the invention is to provide means adapted to cover either or both the seat and body of a vehicle, and also means by which the covers, when not in use, may be rolled within a casing or inclosing shell and hid from view.

With these ends in view our invention consists in the peculiar construction and arrangement of parts as will be hereinafter fully pointed out and claimed.

In the accompanying drawings:—Figure 1 is a vertical longitudinal sectional view through the box or body of a vehicle provided with our improved cover. Fig. 2 is a sectional view on the line $x$—$x$ of Fig. 1. Fig. 3 is a view, similar to Fig. 1, of a slightly modified construction. Fig. 4 is a side elevation showing the end of seat and casing with pawls.

Like letters of reference denote corresponding parts in the several figures of the drawings, referring to which—

A designates the body or box of a vehicle, which may be of any desired size and pattern; and B designates the vehicle-seat which is supported on the body or box, A, in any suitable and desirable manner.

To the ends of the seat, B, are attached bows, C, over which a cover, D, is adapted to be spread and the edges of said cover are provided with any suitable means whereby they can be firmly attached to said bows. The rear lower end of the cover, D, is firmly attached to a winding shaft, E, which is journaled within a casing or inclosing shell, F, attached to and supported by the seat, B. The cover, D, extends through a slot or passage way formed in the casing, F, and one end of the shaft E, extends beyond the end of the casing and is provided with a suitable handle or crank, G. To the shaft, E, is also attached another cover, H, which is adapted, when withdrawn from the casing or inclosing shell, F, to extend over the open body or box, A, in rear of the seat, B, and said cover is provided with suitable means for attachment to the sides of said body or box whereby articles placed in the body can be covered and protected from inclement weather.

Each of the covers, D, H, preferably consists of a central portion which is firmly attached at one end to the winding shaft, E; and of side pieces or strips, adapted to be folded upon the central strip preparatory to winding the covers upon the shaft, E. By this construction the length of the winding shaft is such that it will not extend beyond the ends of the seat.

The slot or passage way formed in the casing, F, for the passage of the covers, D, H, is preferably made large enough to allow a person's hand to be inserted therein to grasp and withdraw said covers therefrom; and said slot may if desired be closed by a suitable cover or slide, or reduced in size and the outer free ends of the central strips of the covers enlarged or provided with transverse bars which will extend across the slot when the covers are wound upon the winding shaft.

The casing or inclosing shell, F, which is preferably made of metal, may be permanently attached to the seat, B, or detachably secured thereto, as shown in the drawings where clamps, K, rigidly attached to the casing, F, are fitted over the back of the seat and held in place by means of set screws, $k$, which pass through the lower arms of the clamps and bear closely against the bottom of the seat.

In Fig. 3 we have illustrated a slight modification of our invention in which the covers, D, H, are attached to and adapted to be wound to independent shafts, E, E'. One end of each of the shafts E, E', extends beyond the casing F and the handle or crank G can be fitted on either of said shafts to wind thereon the cover attached thereto. On the winding shafts, E, E', are secured ratchets, L; and pawls, M, pivoted to the casing, F, are adapted to engage with such ratchets to hold them against rotation. After either of the covers shall have been extended over the portion of the vehicle it is desired to cover and the outer end and sides thereof secured in position the shaft to which said cover is attached can be rotated to draw the cover taut and it will be held in this position by one of the pawls, M, engaging with the ratchet, L, thereon.

From the foregoing description and the drawings it will be seen that we have provided a simple device which can be readily and cheaply attached to any open vehicle and by which either or both the seat and body of said vehicle can be covered and protected in inclement weather. When not in use the covers can be rolled upon the winding shaft or shafts, so as to occupy but a small amount of space, and, if desired, the casing, F, and covers, can be removed from the vehicle. By attaching the casing, F, to the seat it does not in any manner interfere with the loading of the vehicle.

Although we have described our improvement as employing two covers, we are aware that it can be used with advantage where but a single cover is employed to cover only one portion of the vehicle. We are also aware that changes in the form and proportion of parts and details of construction of the devices herein shown and described as an embodiment of our invention can be made without departing from the spirit or sacrificing the advantages thereof; and we therefore reserve the right to make such changes and alterations as fairly fall within the scope of our invention.

Having thus described our invention, what we claim as new, and desire to secure by Letters Patent, is—

1. The combination with a winding shaft journaled in suitable bearings carried by a vehicle, of covers attached to the shaft and adapted to extend in opposite directions therefrom to cover both the body and seat of the vehicle, substantially as described.

2. The combination of a winding shaft journaled in bearings carried by a vehicle seat; and covers attached to said shaft and adapted to extend over both the seat and body of the vehicle, substantially as described.

3. The combination of a casing attached to the seat of a vehicle, independent winding shafts journaled within said casing, and covers attached to said shafts and adapted to extend over both the body and seat of the vehicle, substantially as described.

4. The combination of a slotted casing attached to the seat of a vehicle, independent winding shafts journaled within and projecting beyond one end of said casing, and covers extending through the slot in the casing and attached at their inner ends to the winding shafts, said covers being adapted to extend over both the seat and body of the vehicle, substantially as described.

5. The combination of a casing adapted to be attached to the seat of a vehicle, independent parallel winding shafts journaled within said casing, ratchets secured on the winding shafts, pawls pivotally connected to the casing and adapted to engage with the ratchets on the winding shafts, and covers attached to said shafts and adapted to extend over both the seat and body of the vehicle, substantially as described.

6. The combination of a casing, provided on one side with clamps, set screws carried by the clamps and adapted to hold the casing in position on a vehicle, a shaft journaled in the casing, and a vehicle cover attached to said shaft, substantially as described.

In testimony whereof we affix our signatures in presence of two witnesses.

ROLAN N. WARREN.
WILLIAM H. WIKE.

Witnesses:
JOHN W. SWEENEY,
ALMON B. LEE.